United States Patent
Miller et al.

(10) Patent No.: US 10,374,894 B2
(45) Date of Patent: Aug. 6, 2019

(54) UNINTERRUPTABLE VERIFICATION AND CONTROL UPGRADE FOR REAL-TIME CONTROL SYSTEM

(71) Applicant: General Electric Company, Schenectady, NY (US)

(72) Inventors: Daniel Halvard Miller, Charlottesville, VA (US); Rodney Rice, Charlottesville, VA (US)

(73) Assignee: INTELLIGENT PLATFORMS, LLC, Charlottesville, VA (US)

( * ) Notice: Subject to any disclaimer, the term of this patent is extended or adjusted under 35 U.S.C. 154(b) by 129 days.

(21) Appl. No.: 15/595,011

(22) Filed: May 15, 2017

(65) Prior Publication Data

US 2018/0173182 A1   Jun. 21, 2018

Related U.S. Application Data

(60) Provisional application No. 62/435,610, filed on Dec. 16, 2016.

(51) Int. Cl.
*G05B 19/42* (2006.01)
*H04L 12/24* (2006.01)
(Continued)

(52) U.S. Cl.
CPC ...... *H04L 41/0869* (2013.01); *G05B 19/0423* (2013.01); *G05B 19/0426* (2013.01);
(Continued)

(58) Field of Classification Search
CPC .................................................. G05B 19/056
(Continued)

(56) References Cited

U.S. PATENT DOCUMENTS 5,339,430 A * 8/1994 Lundin ............... G06F 9/44521
719/332
6,668,374 B1 * 12/2003 Sten .......................... G06F 8/65
717/173
(Continued)

FOREIGN PATENT DOCUMENTS

CN 102354174 A 2/2012
CN 202218269 U 5/2012
(Continued)

OTHER PUBLICATIONS

Renesas Electronics Announces Development of Virtualization Technology Suitable for Real-Time Processing of V850 CPU Core. Oct. 12, 2010. [accessed on line] https://www.renesas.com/en-hq/about/press-center/news/2010/news20101012a.html.
(Continued)

*Primary Examiner* — Suresh Suryawanshi
(74) *Attorney, Agent, or Firm* — Marshall, Gerstein & Borun LLP (57) ABSTRACT

Exemplified system and method facilitates update/upgrade and validation of controls systems in an uninterrupted manner. An update/upgrade agent operates with a multiple-processor or multi-processor core system to simultaneously and concurrently implement two real-time embedded controllers in which a first controller executes a current firmware or control application installed at the site while a second controller executes an updated controller firmware or control application.

19 Claims, 8 Drawing Sheets

(51) Int. Cl.
| | |
|---|---|
| *H04L 29/08* | (2006.01) |
| *G05B 19/042* | (2006.01) |
| *G06F 8/65* | (2018.01) |
| *G06F 21/57* | (2013.01) |
| *G05B 19/418* | (2006.01) |
| *H04W 4/38* | (2018.01) |
| *G06F 8/73* | (2018.01) |
| *H04L 12/26* | (2006.01) |
| *H04W 4/00* | (2018.01) |

(52) U.S. Cl.
CPC ..... *G05B 19/4185* (2013.01); *G05B 19/4186* (2013.01); *G05B 19/4187* (2013.01); *G05B 19/41835* (2013.01); *G06F 8/65* (2013.01); *G06F 8/73* (2013.01); *G06F 21/577* (2013.01); *H04L 43/50* (2013.01); *H04L 67/10* (2013.01); *H04L 67/34* (2013.01); *H04W 4/00* (2013.01); *H04W 4/38* (2018.02); *G05B 2219/21086* (2013.01); *G05B 2219/25064* (2013.01); *H04L 41/0253* (2013.01); *H04L 41/24* (2013.01); *Y02P 90/18* (2015.11); *Y02P 90/28* (2015.11); *Y02P 90/86* (2015.11)

(58) Field of Classification Search
USPC .......................................................... 700/87
See application file for complete search history.

(56) References Cited

U.S. PATENT DOCUMENTS

| | | | |
|---|---|---|---|
| 7,010,294 | B1 | 3/2006 | Pyotsia et al. |
| 7,203,560 | B1 | 4/2007 | Wylie et al. |
| 7,263,546 | B1* | 8/2007 | Kostadinov .............. G06F 8/67 709/216 |
| 7,355,730 | B2 | 4/2008 | Landau et al. |
| 7,493,612 | B2* | 2/2009 | Tzeng ...................... G06F 8/65 717/173 |
| 7,669,197 | B1* | 2/2010 | O'Neill .................... G06F 8/658 717/172 |
| 7,673,298 | B2* | 3/2010 | Oyama .................. H04L 63/12 713/189 |
| 7,987,305 | B2 | 7/2011 | Blair et al. |
| 8,155,041 | B2 | 4/2012 | Hong et al. |
| 8,276,009 | B2* | 9/2012 | King ................. H04W 52/0251 713/320 |
| 8,451,753 | B2 | 5/2013 | Vanga et al. |
| 8,601,170 | B1 | 12/2013 | Marr et al. |
| 8,681,571 | B2* | 3/2014 | Fox .................. H03K 19/01754 365/189.09 |
| 8,756,041 | B2 | 6/2014 | Maturana et al. |
| 8,887,056 | B2 | 11/2014 | Breternitz et al. |
| 9,063,639 | B2* | 6/2015 | Grewal .................. G05B 19/05 |
| 9,253,054 | B2 | 2/2016 | Maturana et al. |
| 9,798,534 | B1* | 10/2017 | Yi ....................... G06F 11/0727 |
| 2002/0130846 | A1 | 9/2002 | Nixon et al. |
| 2003/0204373 | A1 | 10/2003 | Zielinski et al. |
| 2005/0122232 | A1 | 6/2005 | DeGroot |
| 2005/0273681 | A1 | 12/2005 | Hopkins |
| 2006/0179058 | A1* | 8/2006 | Bram ..................... G06F 21/121 |
| 2008/0114902 | A1 | 5/2008 | Leong et al. |
| 2008/0127356 | A1* | 5/2008 | Hsu ....................... G06F 21/572 726/30 |
| 2009/0076628 | A1* | 3/2009 | Smith ................ G05B 19/4184 700/3 |
| 2010/0023140 | A1 | 1/2010 | Kodama et al. |
| 2011/0022192 | A1 | 1/2011 | Plache et al. |
| 2012/0291021 | A1 | 11/2012 | Banerjee et al. |
| 2013/0191106 | A1 | 7/2013 | Kephart et al. |
| 2013/0211555 | A1 | 8/2013 | Lawson et al. |
| 2013/0211559 | A1 | 8/2013 | Lawson et al. |
| 2014/0075015 | A1 | 3/2014 | Chan et al. |
| 2014/0101652 | A1 | 4/2014 | Keshav et al. |
| 2014/0189677 | A1 | 7/2014 | Curzi et al. |
| 2014/0335480 | A1 | 11/2014 | Asenjo et al. |
| 2014/0336795 | A1 | 11/2014 | Asenjo et al. |
| 2014/0337429 | A1 | 11/2014 | Asenjo et al. |
| 2015/0012763 | A1 | 1/2015 | Cohen et al. |
| 2015/0019191 | A1 | 1/2015 | Maturana et al. |
| 2015/0082309 | A1 | 3/2015 | Lambert et al. |
| 2015/0287318 | A1 | 10/2015 | Nair et al. |
| 2016/0132538 | A1 | 5/2016 | Bliss et al. |
| 2016/0274552 | A1 | 9/2016 | Strohmenger et al. |
| 2016/0373944 | A1 | 12/2016 | Jain et al. |
| 2017/0180239 | A1 | 6/2017 | Hittel et al. |
| 2017/0257262 | A1 | 9/2017 | Dalal |
| 2018/0024847 | A1 | 1/2018 | Campbell et al. |
| 2018/0026840 | A1 | 1/2018 | Toepke et al. |
| 2018/0052451 | A1 | 2/2018 | Billi-Duran et al. |
| 2018/0176335 | A1 | 6/2018 | McNab |
| 2018/0210428 | A1 | 7/2018 | Jundt et al. |

FOREIGN PATENT DOCUMENTS

| | | |
|---|---|---|
| EP | 2688019 A1 | 1/2014 |
| EP | 2924570 A2 | 9/2015 |

OTHER PUBLICATIONS

Achieving Real-Time Performance on a Virtualized Industrial Control Platform. Jul. 15, 2014. [accessed on line] http://https://www.intel.com/content/dam/www/public/us/en/documents/white-papers/industrial-solutions-real-time-performance-white-paper.pdf.

Chris Grujon, The need for embedded virtualization in real-time, multiprocessor, multi-OS systems. Jun. 2016. [accessed on line] http://embedded-computing.com/articles/the-multiprocessor-multi-os-systems/.

Distributed control system software upgrade, NovaTech's updated DCS software, D/3 Version 15 (D3v15) adds features that are focused on modernizing configuration, improving operator interfaces, and facilitating reporting. Apr. 5, 2016. [accessed on line] http://www.controleng.com/single-article/distributed-control-system-software-upgrade/e24abcb53c6f4f851d05cd1f7293ea2c.html.

Thorve et al., Step-by-step guide to IBM Power Systems firmware update. License Internal Code (LIC) upgrade process. Mar. 26, 2013. [accessed on line] https://www.ibm.com/developerworks/aix/tutorials/au-power-systems-firmware-upgrade/au-power-systems-firmware-upgrade-pdf.pdf.

International Search Report and Written Opinion issued in connection with corresponding PCT Application No. PCT/US2017/064382 dated Mar. 15, 2018.

Welander, Make your I/O smarter, Control Engineering, www.conlroleng.com/single-article/make-your-iosmarter/37788148d81ce850279c60f46135457b.hlml, last visited Jan. 2013, 3 pp.

"Leading Technology in Ethernet Relays, Data Acquisition, and Remote Monitoring, ConlrolByWeb, www.conlrolbyweb.com/, last visited Aug. 4, 2016, 6 pp."

"Advantech Launches WISE-4051: RS-485 Wireless 1/0 Module with Cloud Connectivity and IoT Protocol, AdvantechCo. Ltd., www2.advantech.in/eautomation/remote-io/news.aspx?doc_id=88f8f32e-fc95-4484-a02c-80543cf7fd56, last visited Jul. 11, 2016, 2 pp."

Feld, Joachim, "Profinet—Scalable Factory Communication for All Applications", Factory A10 Communication Systems, 2004. Proceedings. 2004 IEEE International Workshop, pp. 33-38 (2004).

Electrical and Instrumentation Loop Check, IEC Webstore International Electrotechnical Commission, Edition 2.0, pp. 42 (2012).

Hazarika, Pinku et al., "Mobile Cloud Integration for Industrial Data Interchange", Advances in Computing, Communications and Informatics (ICACCI), pp. 1118-1122 (2015).

* cited by examiner

UNINTERRUPTABLE VERIFICATION AND CONTROL UPGRADE FOR REAL-TIME CONTROL SYSTEM

RELATED APPLICATION

This application claims prior to, and the benefit of, U.S. Prov. Appl. No. 62/435,610, filed Dec. 16, 2016, title "INDUSTRIAL INTERNET CONNECTED CONTROL SYSTEM," which is incorporated by reference herein in its entirety.

TECHNICAL FIELD

The disclosure generally relates to systems and processes in automation controls, specifically, systems and methods to validate and to update/upgrade instructions in automation controls.

BACKGROUND

Embedded control systems ("control systems") are used in a wide variety of different field applications. Conventional processes to update or upgrade control system firmware and major software application generally involves taking the system off-line, e.g., when the control system is not actively controlling the plant and/or components of the system, and conducting extensive validation processes of the update/upgrade.

For example, in wind turbine control, performing a firmware upgrade may require dispatching a field engineer to the site, taking the wind turbine off-line, performing the upgrade, and then bringing the turbine back online. This can take several hours to complete and costs the wind-farm owner in lost electric energy generation. For gas turbines and steam turbines, the process can take days.

In the modern connected world, it is important that customers run the latest firmware to address both operational issues and cyber-security vulnerabilities.

SUMMARY

Exemplified system and method facilitates update/upgrade and uninterrupted validation of controls systems of an industrial asset—that is, the update/upgrade and validation is performed in-situ without the industrial asset being taken offline. An update/upgrade agent operates with a multiple-processor or multi-processor core system to concurrently implement two or more real-time embedded controllers in which a first controller executes a current firmware and control application and a second controller implements an updated controller firmware or control application. Each of the first and controllers are provided the same control inputs to compute outputs with the control outputs the first controller being initially selected to control the industrial asset. The update/upgrade agent validates the internal states and outputs of the second controller to provide an in-situ switch to the new control firmware following the validation.

The exemplified system and method facilitate more frequent update/upgrade of the embedded control systems. To this end, the latest firmware to address operational issues can be pushed to industrial assets without taking such industrial assets off-line. In addition, the latest firmware to address cyber-security vulnerabilities (which may or may not be related to control operations) can be pushed to the industrial assets frequently, facilitating prevention of data breaches and cyber intrusions that can affect real-time control processes.

In some embodiments, the system includes a hypervised control platform that concurrently runs multiple real-time control systems. The hypervised control platform comprises a multi-core CPU(s) and is configured to execute, at least, two real-time control system instances. Each of the real-time control system instances receives the same control inputs to compute the control outputs. Control state information are exchanged between the instances. Once the new hypervised instance executing the update/upgrade instructions is validated, an in-situ switch to the new hypervised instance is activated.

In an aspect, a method is disclosed (e.g., of operating an update/upgrade agent to provide update/upgrade instructions for a control system in an uninterrupted manner and to provide in-situ validation of the update/upgrade instructions executing at the control system). The method includes, in response to receiving (e.g., at an update/upgrade agent) second instructions (e.g., updated or upgraded control instructions) for execution on an embedded control system having a first processor core and a second processor core, executing the second instructions on the second processor core to generate a second stream of control parameters (e.g., an output PWM waveform or a digitization of a feedback loop), wherein the first processor core concurrently executes a first instructions to generate a first stream of control parameters, and wherein i) the first stream and second stream are selectable to be outputted to an input-output interface of the embedded control system to control an asset (e.g., an industrial asset) and ii) a portion of the first stream and a corresponding portion of the second stream, or one or more parameters derived therefrom, are graphically presented at a computing device (e.g., a user device connected to a computing device associated with the cloud control infrastructure that is operatively coupled to the embedded control system) to validate operation of the second instructions executing on the second processor core in-situ to corresponding control operations of the first processor core; and, in response to receiving a selection command (e.g., an in-situ switch-over command) associated with selection of the second stream, causing the second stream to be outputted to the input-output interface of the embedded control system to control the asset.

In some embodiments, the first processor core continues to generate the first stream (e.g., persistently continues until instructed otherwise) after the second stream generated by the second processor core is selected to be outputted to the input-output interface.

In some embodiments, the method includes monitoring the second stream (prior to the switch-over to first stream) to determine if one or more parameters of the second stream meets one or more pre-defined conditions (e.g., trip condition); and, in response to a condition of the pre-defined conditions being met, causing the first stream to be outputted to the input-output interface of the computing device to control the asset (e.g., and further generating an alert, notification, and/or report of the condition).

In some embodiments, the portion of the first stream and the corresponding portion of the second stream, or the one or more parameters derived therefrom, are graphically presented at a user computing device (e.g., a user device (e.g., mobile device, desktop, and etc.)), the presentation being made available from a cloud control infrastructure.

In some embodiments, comparison parameters derived from the portion of the first stream and the corresponding portion of the second stream are graphically displayed at the user computing device (e.g., wherein the comparison parameters are determined at the field agent, at the RT controller, or at the cloud control infrastructure) (e.g., wherein the comparison parameters are selected from the group consisting of a difference of one or more determined 10 parameter values, a difference of one or more control parameter values, a difference of one or more operational states of controller.)

In some embodiments, the second instructions are received at an update/upgrade agent executing on the embedded control system.

In some embodiments, the second instructions are received at an update/upgrade agent executing on a field device operatively coupled to the embedded control system.

In some embodiments, the second instructions are received at an update/upgrade agent executing on a computing device located in a cloud control infrastructure.

In some embodiments, the first processor core and the second processor core are located on a same processor, wherein the first instructions are executed on a first hypervised instance executing on the first processor core, and wherein the second instructions are executed on a second hypervised instance executing on the second processor core.

In some embodiments, the first processor core is located on a first processor, and wherein the second processor core is located on a second processor.

In some embodiments, the first and second instructions each includes firmware instructions and operating system (O/S) instructions.

In some embodiments, the first and second instructions each includes deterministic real-time control instructions.

In some embodiments, the method includes validating, for a pre-defined period (e.g., control cycles), the portion of the first stream and the corresponding portion of the second stream, or the one or more parameters derived therefrom; and generating a report, wherein the report includes differences therebetween.

In some embodiments, the method includes monitoring the portion of the first stream and the corresponding portion of the second stream, or the one or more parameters derived therefrom, for deviations based on a set of validation criteria (e.g., wherein deviation parameters are specified by an operator) and/or for instability conditions (e.g., existing trip conditions, warning conditions, and etc.). In some embodiments, the deviations are established (e.g., at the field agent or at the cloud control infrastructure) based on a set of historical data associated with the asset (e.g., the industrial asset) or a set thereof (e.g., a fleet of the asset).

In some embodiments, the method includes receiving a validation command that causes the second stream to be outputted to the input-output interface for a pre-defined period of time (e.g., 10-20 sample periods), wherein after the pre-defined period, the first stream is outputted (e.g., persistently outputted until instructed otherwise) to the input-output interface.

In some embodiments, the method includes receiving a validation sequence command that comprises a sequence of validation commands, wherein with each successive validation command within the sequence, a given pre-defined period of time associated with a current validation command is lengthen compared to that of a previous validation command, wherein each validation command includes a pre-defined period that the second stream is outputted to the input-output interface such that, after the pre-defined period, the first stream is outputted to the input-output interface.

In some embodiments, the method includes, in response to receiving the second instructions, stopping execution of third instructions executing on the second processor.

In another aspect, an apparatus (an update/upgrade agent) is disclosed. The apparatus includes a processor; and a memory having instructions stored thereon (e.g., associated with a field agent), wherein execution of the instructions, cause the processor to: in response to receiving (e.g., at an update/upgrade agent) second instructions (e.g., updated or upgraded control instructions) for execution on an embedded control system having a first processor core and a second processor core, execute the second instructions on the second processor core to generate a second stream of control parameters, wherein the first processor core concurrently executes a first instructions to generate a first stream of control parameters, and wherein the first stream and second stream are selectable to be outputted to an input-output interface of the computing device to control an asset (e.g., an industrial asset) and a portion of the first stream and a corresponding portion of the second stream, or one or more parameters derived therefrom, are graphically presented at a computing device (e.g., a user device connected to a computing device associated with the cloud control infrastructure) to validate operation of the second instructions executing on the second processor core in-situ to corresponding control operations of the first processor core; and, in response to receiving a selection command (e.g., an in-situ switch command) associated with selection of the second stream, cause the second stream to be outputted to the input-output interface of the embedded control system to control the asset.

In another aspect, a non-transitory computer readable medium is disclosed, the computer readable medium having instructions stored thereon, wherein execution of the instructions, cause the processor to: in response to receiving (e.g., at an update/upgrade agent) second instructions (e.g., updated or upgraded control instructions) for execution on an embedded control system having a first processor core and a second processor core, execute the second instructions on the second processor core to generate a second stream of control parameters, wherein the first processor core concurrently executes a first instructions to generate a first stream of control parameters, and wherein the first stream and second stream are selectable to be outputted to an input-output interface of the computing device to control an asset (e.g., an industrial asset) and a portion of the first stream and a corresponding portion of the second stream, or one or more parameters derived therefrom, are graphically presented at a computing device (e.g., a user device connected to a computing device associated with the cloud control infrastructure) to validate operation of the second instructions executing on the second processor core in-situ to corresponding control operations of the first processor core; and, in response to receiving a selection command (e.g., an in-situ switch command) associated with selection of the second stream, cause the second stream to be outputted to the input-output interface of the embedded control system to control the asset.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED SPECIFICATION

Before the present methods and systems are disclosed and described, it is to be understood that the methods and systems are not limited to specific methods or to specific components. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other components or steps. "Exemplary" means "an example of" and is not intended to convey an indication of a preferred or ideal embodiment. "Such as" is not used in a restrictive sense, but for explanatory purposes. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

Figure 1:
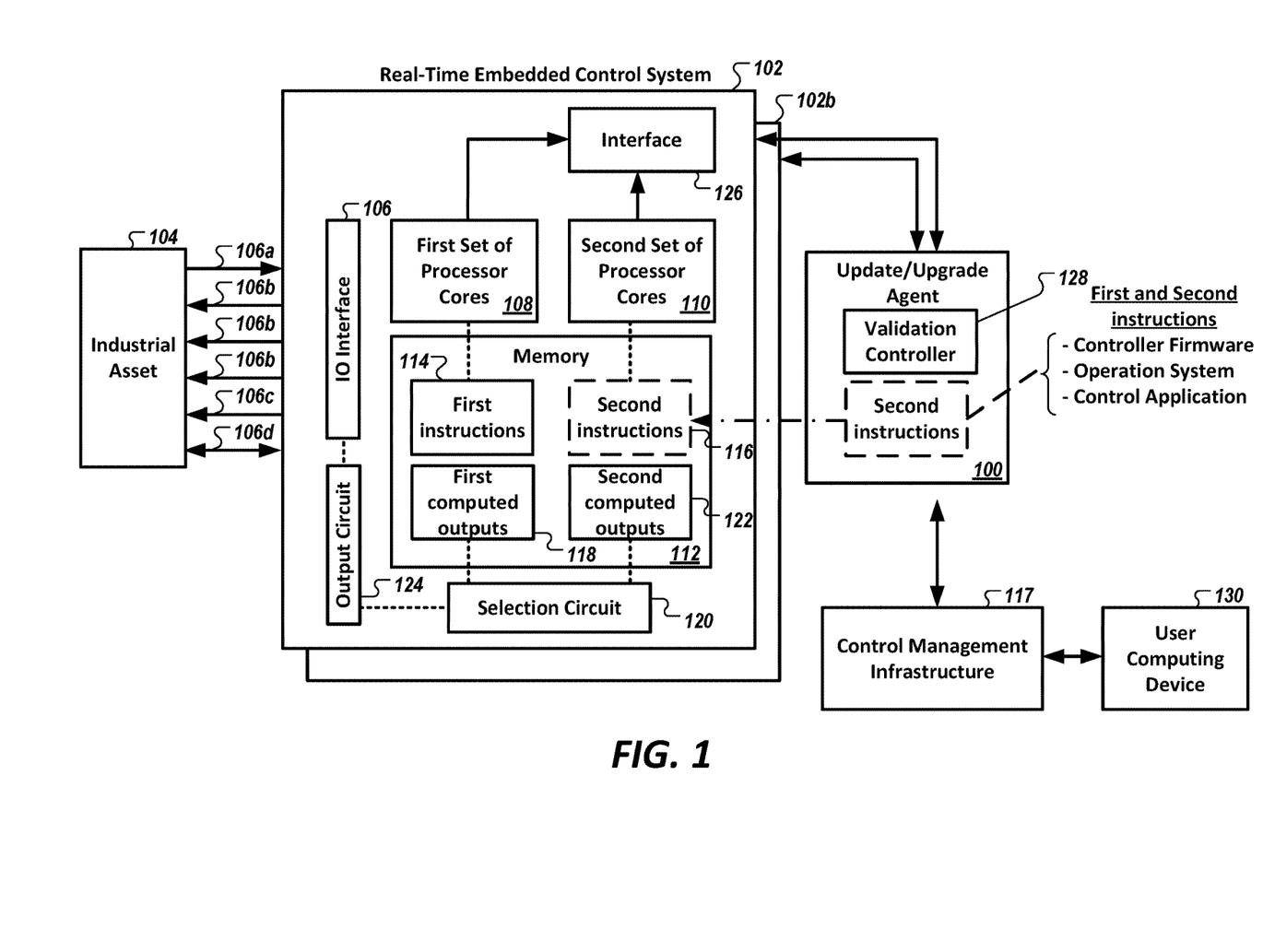
FIG. 1 illustrates an example update/upgrade agent configured to provide update/upgrade instructions for a control system in an uninterrupted manner and to provide in-situ validation of the update/upgrade instructions executing at the control system, in accordance with an illustrative embodiment.

FIG. 1 illustrates an example update/upgrade agent 100 configured to provide update/upgrade instructions for a real-time embedded control system 102 in an uninterrupted manner and to provide in-situ validation of the update/upgrade instructions executing at the control system 102, in accordance with an illustrative embodiment. As shown in FIG. 1, the real-time embedded control system 102 is configured to provide deterministic real-time control processes for an industrial asset 104. These deterministic real-time control processes, in some embodiments, are performed in sub-millisecond time period. A deterministic real-time control process for a motor or servo drive, for example, can include closed-loop PWM (pulse-width modulated) outputs and can be executed in the order of hundreds of microseconds (μs) or less.

Examples of other industrial assets 104 include plant assets such as, for example, but not limited to: equipment and machines used in power generation (e.g., gas turbines, wind turbines, solar power converters, stream turbine, nuclear reactors, plant controls, etc.), in power distribution (e.g., sub-station equipment, transmission equipment, etc.), in water and waste treatment (e.g., pumps, motors, relays, etc.), in recycling, in garbage processing (e.g., furnaces, conveyor system, sorters, etc.), in manufacturing (e.g., automation equipment, warehouse equipment, etc.), in healthcare (e.g., diagnostics equipment, imaging systems, lab equipment, etc.), in transportation (e.g., jet engines, locomotive engines, vehicles, cargo containers, cargo vessels, cargo trucks, freight transport, road vehicles, etc.), in refining, in mining (e.g., excavation equipment, etc.), in oil exploration (e.g., well equipment), in natural gas exploration (e.g., well equipment), in pipeline infrastructure (e.g., pumps, valves, monitoring equipment, etc.), in data centers (e.g., cooling equipment, etc.), among others. Further examples of industrial assets 104 are described in U.S. Prov. Appl. No. 62/435,610, filed Dec. 16, 2016, title "INDUSTRIAL INTERNET CONNECTED CONTROL SYSTEM," which is incorporated by reference herein in its entirety.

Referring to FIG. 1, the industrial asset 104 is operatively coupled to an IO interface 106 (input-output interface) of the real-time embedded control system 102. In some embodiments, the IO interface 106 is configured to receive control inputs (e.g., current or voltage inputs 106a) from sensors associated with the industrial asset 104 and to generate control outputs (e.g., PWM outputs 106b, protection outputs 106c, and etc.) to regulate the industrial asset 104, as well as ports for serial or parallel communication 106d.

Referring still to FIG. 1, the real-time embedded control system 102 includes a first set of processor cores 108 and a second set of processor cores 110. Here, a "set" refers to one or more processor cores. In some embodiments, the first set of processor cores 108 and the second set of processor cores 110 are part of a same, single multi-core processor component (e.g., chipset). A processor core is an independent processing unit that read and execute program instruction and can be located with other cores within a single computing component (e.g., a multi-core CPU chipset). In other embodiments, the first set of processor cores 108 is part of a first processor or first multi-core processor component (e.g., a first multi-core CPU chipset) and the second set of processor cores 110 is part of a second processor or multi-core processor component (e.g., a second multi-core CPU chipset).

The processor cores 108 and 110 are coupled to memory 112 configured to store, at least, first instructions 114 and second instructions 116. In some embodiments, the first and second instructions 114, 116 each includes controller firmware instructions, operating system instructions, and control application instructions. Control application are operational instruction relating to the control of the industrial asset (e.g., control loop) and include read-only portion that fixed and write portion that may include control state information. Firmware are read-only instructions that includes underlying instructions for device control, device monitoring, and data manipulation, among others. Firmware can also include instructions to protect the real-time embedded control system from unauthorized intrusion, hacking, and the like and to monitor for malicious instructions to which the real-time embedded control system may be exposed. The second instructions, which is intended to replace the first instructions, preferably include updated instructions to firmware, operating system, or control application, and addresses an existing vulnerability or issue in such instructions. These vulnerability may be unrelated to the operation of the real-time embedded control system but makes the real-time embedded control system vulnerable to corruption, unintended manipulation in some manner. In some embodiments, the second instructions include control state information for the controller firmware instructions, operating system instructions, and control application instructions. These control state information may include setpoint and operational values relating to the execution of controller firmware instructions, operating system instructions, and control application instructions. In some embodiments, the control state information are preserved and stored as an image capture of execution of controller firmware instructions, operating system instructions, and control application instructions on a first set of hardware/device and is replicated for execution on a second set of hardware/device.

Referring still to FIG. 1, the real-time embedded control system 102 is commutatively coupled to the update/upgrade agent to receive the second instructions 116 from a local or remote controller (shown as "Control Management Infrastructure" 117). The update/upgrade agent 100 serves a relay/gateway for updatable or upgradable instructions for a given real-time embedded control system 102 or a set of real-time embedded control system (in FIG. 1, a second real-time embedded control system 102b is shown). In some embodiments, the control management infrastructure 117 is a local controller configured to communicatively couple to the update/upgrade agent 100. In some embodiments, the user interface to the control management infrastructure 117 is mobile friendly and cloud aware such that an end-user can access, via said interface (e.g., on a user computing device 130), validation data, generate reports, and perform the upgrade from a remote location.

In some embodiments, the control management infrastructure 117 is a cloud-based control infrastructure. That is, storage, networking, processing computing resources in a network are used to archive and push the various instructions and versions thereof to the update/upgrade agent 100. In some embodiments, the cloud-based control infrastructure provides notifications/alerts of errors and validation issues detected by the update/upgrade agent 100 during the update/upgrade event. In some embodiments, the cloud-based control infrastructure provides a user portal to access reports with summary of the validation status and results.

Referring still to FIG. 1, the first set of processor cores 108 execute the first instructions 114 to provide deterministic control outputs (shown as "First computed outputs" 118) to control the industrial asset 104 (e.g., via open-loop control; or via closed-loop control using feedback from control inputs received at the TO interface 106). The first computed outputs 118 form a first stream of control parameters over a number of control cycles. In some embodiments, the first computed outputs 118 are stored, for each control cycle, in a first location in memory 112 to be accessed by digital logic circuitries (e.g., a field-programmable gate array (FPGA), complex programmable logic device (CPLD), application-specific integrated circuit (ASIC), or combination logics) that implements a selector circuit 120. In addition, the first set of processor cores 108 stores updated control state information (e.g., setpoint and model parameters), for example, within a shared memory space to be accessed by the second set of processor cores 110.

The second set of processor cores 110 uses the control state information when executing elements of the second instructions 116 to provide a same deterministic control outputs (shown as "Second computed outputs" 122) that can also be used to also control the industrial asset 104. The second computed outputs 122 are concurrently stored (with the first computed outputs 118), for each control cycle, in a second location in memory 112. The second computed outputs 122 form a second stream of control parameters over a number of control cycles. In some embodiments, the control state information generated from execution of the second instructions by the second set of processor cores are stored in a second memory location to be evaluated against the control state information generated by the first set of processor cores.

The selector circuit 120 is configured to access, e.g., via a local bus (not shown), the first or second computed outputs 118, 122 stored in the memory 112 and to provide a selected computed outputs (e.g., 118 or 122) to an output circuit 124 (e.g., a digital-to-analog converter (DAC), a PWM output) that outputs a control output signal at the IO interface 106 for regulating and/or controlling the industrial asset 104.

Referring still to FIG. 1, the first computed outputs 118 and the second computed outputs 122, or a parameter derived therefrom, and generated control state information associated with execution of each of the set of cores, are made locally available to the update/upgrade agent 100 (i.e., a local or remote agent) over a bus or communication interface shown as "interface" 126. In some embodiments, the bus or communication interface 126 is a high-speed data or communication bus that operatively couples to the update/upgrade agent 100 which is implemented as part of the real-time embedded control system 102. In other embodiments, the bus or communication interface 126 is a high-speed communication channel that operatively couples to the update/upgrade agent 100 which is implemented in a standalone controller or a remote controller.

In some embodiments, the real-time embedded control system 102 includes real-time code that directs the first or second set of processor cores, or a portion thereof, to combine the first computed outputs 118 and the second computed outputs 122 (e.g., via an XOR operator), and the two sets of generated control state information, to generate a combined output to be transmitted to the update/upgrade agent 100 over a bus or communication interface 126. In some embodiments, the real-time embedded control system 102 includes real-time code that directs the first or second set of processor cores, or a portion thereof, to compare the first computed outputs 118 and the second computed outputs 122 and to compare the different set of control state information to generate a difference output to be transmitted to the update/upgrade agent 100, e.g., over a bus or communication interface 126. The validation assures that differences between the first controller and second controller of the real-time embedded control system 102 are expected. In some embodiments, the update/upgrade agent 100 is configured to generate reports for evaluation when it observes differences that are not expected.

In-Situ Control Validation

As discussed in relation to FIG. 1, the selector circuit 120 is configured to access, e.g., via a local bus, the first or second computed outputs 118, 122 stored in the memory 112 and to provide a selected computed outputs (e.g., 118 or 122) to an output circuit 124 (e.g., a digital-to-analog converter (DAC), a PWM output) that outputs a control output signal at the IO interface 106 for regulating and/or controlling the industrial asset 104. The selector circuit 120 and operation therewith facilitates uninterrupted and live operation of the real-time embedded control system 102 and the industrial asset 104 during the control update and validation processes.

In some embodiments, other validation tools to evaluate the firmware and operating system are also executed on the real-time embedded control system. For example, various memory locations of the real-time embedded control system may be scanned and off-loaded to be analyzed to assess expected or unexpected operations of various components of the firmware and operating system.

In some embodiments, the selector circuit 120 is configured to select between the first computed outputs 118 or the second computed outputs 122 via a selection command (also referred to as an in-situ switch-over command) transmitted from the update/upgrade agent 100. In some embodiments, the selector circuit 120 is configured to temporarily select the second computed outputs 122 for a single or finite number of control cycles and then to switch the selection back to the first computed outputs 118. In some embodiments, a validation controller 128 in conjunction with the update/upgrade agent 100 is configured to validate a single or finite number of sample periods of the control cycle. The in-situ switch-over command also serves as persistent switch-over command, e.g., after validation is completed and as a switch-back command in the event of detected fault condition associated with execution of the updated instructions—neither of which would result in an interruption to the operation of the industrial asset 104 or the real-time embedded control system 102.

In some embodiments, the update/upgrade agent 100 directs a state machine in the real-time embedded control system 102 to perform the validation across the single or multiple sample periods. Because the real-time embedded control system has multiple states of operation, multiple sample periods facilitate a complete validation by confirming outputs and internal states at each of the multiple states of operations.

In some embodiments, following the initial single sample period validation being completed, the update/upgrade agent 100 enters a mode that validates the control outputs over multiple sample periods.

In some embodiments, the number of sample periods that the new system is configured to control is incrementally increased following each successful validation period. For example, the validation sequence may start with a 10-sample validation period and then incrementally increase the validation period to 20 samples in which control is transferred back to the original control system during periods that validation is not occurring. Other number of samples and validation sequences may be used.

Figure 2:
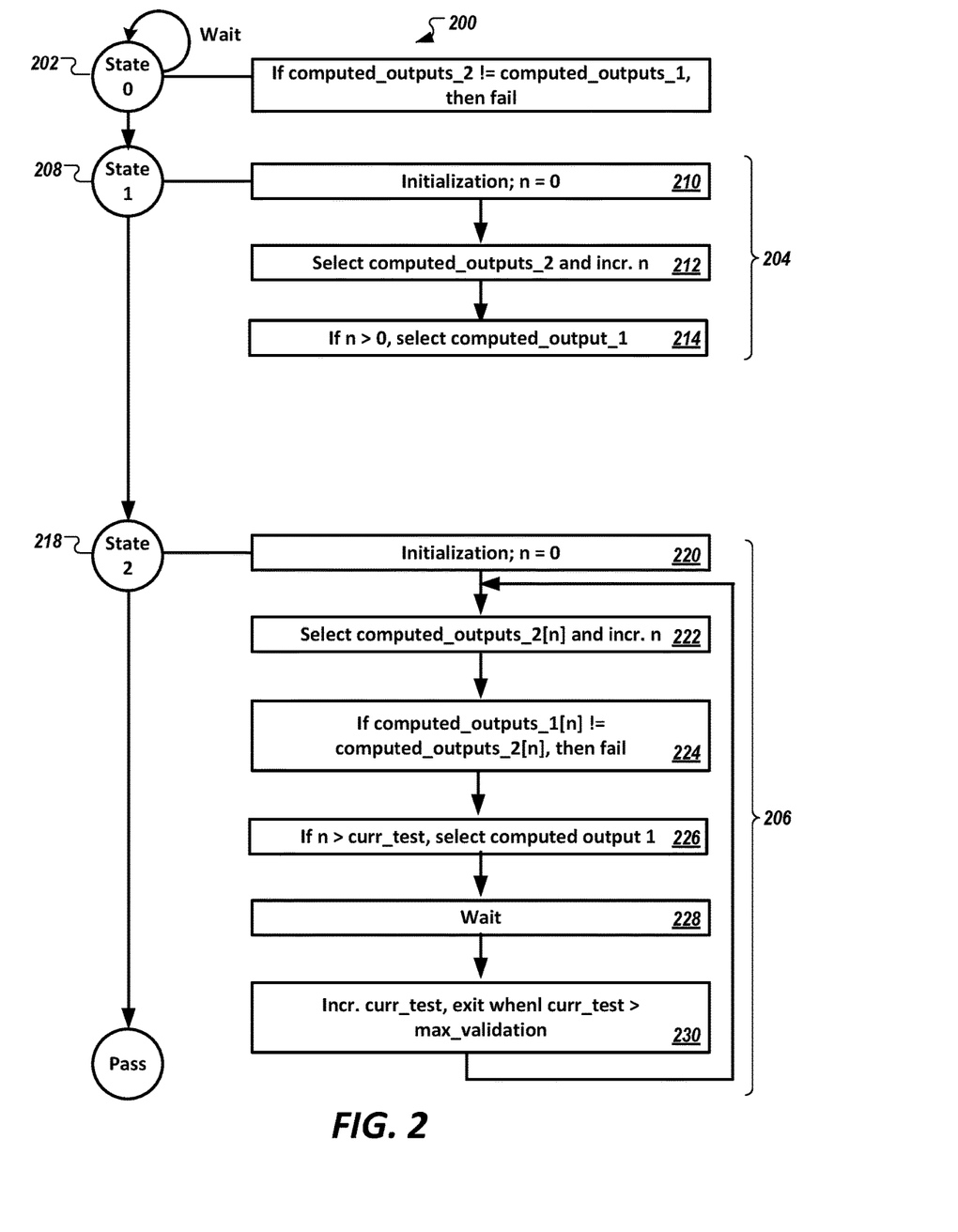
FIG. 2 is a diagram of an example state machine for the in-situ validation operation by a validation controller that operates with the update/upgrade agent, in accordance with an illustrative embodiment

FIG. 2 is a diagram of an example state machine 200 for the in-situ validation operation by a validation controller (e.g., real-time embedded control system 102) that operates with the update/upgrade agent 100, in accordance with an illustrative embodiment. In some embodiments, the state machine 200 is executed on a validation controller 128 (see FIG. 1).

In some embodiments, the validation controller 128 is implemented as digital logic circuitries, or via one of the sets of processor cores, that forms a local controller in the real-time embedded control system 102. In other embodiments, the validation controller 128 is a remote controller commutatively coupled to the real-time embedded control system 102 over a high-speed and deterministic link. In some embodiments, the validation controller 128 is a part of the update/upgrade agent 100.

Referring still to FIG. 2, the state machine 200 includes an initial waiting state (shown as "State 0" 202) as the validation controller 128 waits for a command from the update/upgrade agent 100 to initiate a validation sequence for the control of the industrial asset 104. Validation of the firmware operations and operating system operations may be performed prior to validation of the control operations, e.g., while the state machine 200 is in the waiting state. In the waiting state, the state machine 200, in some embodiments, directs the validation controller 128 to compare the first computed outputs 118 (shown as "computed_output_1") with the second computed outputs 122 (shown as "computed_output_2"). In some embodiments, the comparison is performed by one or more of the first or second set of processor cores 108, 110 or by digital logic circuits. The first and second computed outputs 118, 122 may include bit-wide register data, multi-bit wide register data, byte-wide register data, and multiple-byte wide register data associated with digital outputs and analog outputs (e.g., integers and floating numbers) of the controls. In some embodiments, a digital circuit (e.g., in a FPGA, CPLD, ASIC, and etc.) is configured to compare individual register values to detect any differences therebetween. In some embodiments, the memory locations, and memory blocks thereof, associated with the first and second computed outputs 118, 122 are compared to detect any differences in the register values therein.

In some embodiments, the test program is used to change inputs to the controls and to observe whether an expected outcome is generated.

In FIG. 2, two example validation sequences 204 and 206 are shown. In the first validation sequence 204 corresponding to "State 1" 208, the state machine 200 facilitates the initial single sample period validation. The first validation sequence 204, in some embodiments, includes initializing (210) a validation window period n to an initial state (shown in FIG. 2 as "0"). The state machine 200 directs then the real-time embedded control system 102, via the selector circuit 120, to select (212) the second computed outputs 122. The state machine 200 then increments the validation window period n. The state machine 200 then directs the real-time embedded control system 102 to select (214) the first computed outputs 118. The first validation sequence 204 confirms proper connections among the hardware and software circuits of the real-time embedded control system 102.

Referring still to FIG. 2, in the second validation sequence 206 corresponding to "State 2" 218, the state machine 200 facilitates multiple sample period validations of incrementally varying periods. The second validation sequence 206, in some embodiments, includes initializing (220) the validation window period n to an initial state. The state machine 200 then directs the real-time embedded control system 102, via the selector circuit 120, to select (222) the second computed outputs 122 and to switch back (226) to the first computed outputs 118 after the validation window period n has passed. During each switch over, the state machine 200 directs (224) the validation controller 128 to compare the first computed outputs 118 with the second computed outputs 122 and to direct the real-time embedded control system 102 to switch-back to the first computed outputs 122 upon a mismatched being detected. The state machine 200 then directs the real-time embedded control system 102 to increment (230) the validation window period n for a next validation sequence following a pre-defined waiting state (228). The second validation sequence 206 increases confidence in the second instructions in properly and correctly generating outputs for the real-time embedded control system 102. Because of the control speed of the real-time embedded control system 102, the validation sequences 204, 206 (as shown in FIG. 2) may take only a few seconds or minutes to perform.

Figure 3:
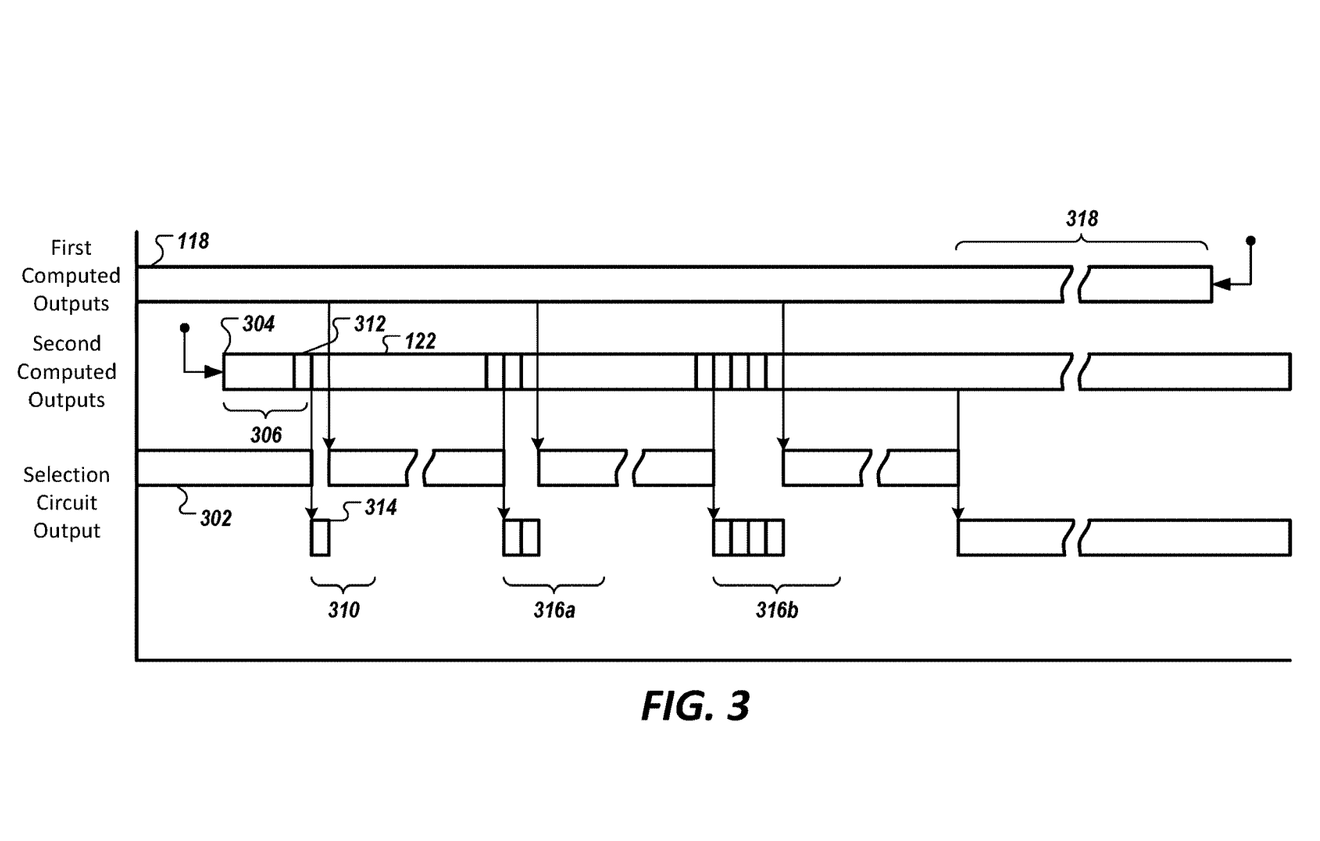
FIG. 3 is a diagram showing timing of the validation sequences of FIG. 2, in accordance with an illustrative embodiment.

FIG. 3 is a diagram showing timing of the validation sequences of FIG. 2, in accordance with an illustrative embodiment. As shown in FIG. 3, the real-time embedded control system 102 is operating live in generating the first computed outputs 118 from the control inputs and providing, based on the first computed outputs 118, control outputs (302) to regulate the industrial assets 104. Upon the second instructions 116 being provided to the real-time embedded control system 102 by the update/upgrade agent 100, the second set of processor cores 110 execute the second instructions to generate (shown as time 304) the second computed outputs 122. The second computed outputs 122 are generated for some time 306 until a validation sequence is executed. As discussed in relation to FIG. 2, validation of the firmware and operating system operations may be performed prior to validation of the control operations. The validation sequences may be initiated by a technician or engineer.

A first validation sequence 310, as described in relation to FIG. 2, is performed at after time 306 in which the selector circuit 120 selects the second computed outputs 122 for one of the control cycle and then switches back to the first computed outputs 118. As shown in FIG. 3, the second computed output 122 for a given control cycle n (312) is selected to be outputted in a next control cycle (314).

Following the first validation sequence 310, a second validation sequence comprising of multiple sample period validations of incrementally varying periods (shown as sequences 316a and 316b), as described in relation to FIG. 2, is then performed in which the selector circuit 120 selects the second computed outputs 122 for an increasing number of the control cycles and switch back to the first computed outputs 118. As shown in FIG. 3, the second computed output 122 for a given control cycle n (312) is selected to be outputted in a next control cycle (314). Although two sequences 316a, 316b are illustrated, other number of repetitions and varying of the periods may be used.

After the validation is complete, at some point, the update/upgrade agent 100 provides a persistent switch-over command to the real-time embedded control system 102 to select the second computed outputs 122. Notably, the first set of processor cores 108 continue to generate (318) the first computed outputs 118 for an extended period of time after the validation is completed. In some embodiments, this period can be days or months after the switch-over and validation period has been completed. The first set of processor core continues to generate the first computed outputs, which serves as a backup stream to the second computed outputs. To this end, if issues are observed (e.g., by the operator or via notification from the update/upgrade agent), the end user or operator can switch the real-time embedded control system to using the outputs from the older firmware version (i.e., the first instructions). In some embodiments, the update/upgrade agent is configured to continue to generate periodic reports of the evaluation of the newer firmware version (i.e., the second instructions). In some embodiments, the first set of processor cores 108 continues to generate (318) the first computed outputs 118 until a next update or upgrade event is performed.

The in-situ validation process, described herein, facilitates earlier and more frequency updates and/or upgrades of lower level control operations, firmware operations, and operating system operations, of the real-time embedded control systems; many of these lower-level control operations not necessary being related to the control loops associated with control of the industrial asset. As discussed, these updates and/or upgrades can address flaws and vulnerabilities of the real-time embedded control system to corruption and/or undesired manipulation.

In some embodiments, the update/upgrade agent 100 includes validation modeling tools configured to monitor the real-time control application for significant deviations among the controllers (i.e., the first set and second set of processor cores) and for significant instabilities in the operation of the real-time control and the underlying firmware and operating system. In some embodiments, the update/upgrade agent 100 is configured to establish, using historical data (e.g., associated with the first computed outputs), output bounds in the controls associated with nominal behavior. In some embodiments, the output bounds are established based on a model generated from the historical data in which the model defines an outside bound for an automatic switch back to the original control system (e.g., the first computed outputs). In some embodiments, the control output bounds is selectable as a manual input that is provided by an end user.

Example In-Situ Update/Upgrade

Figure 4:
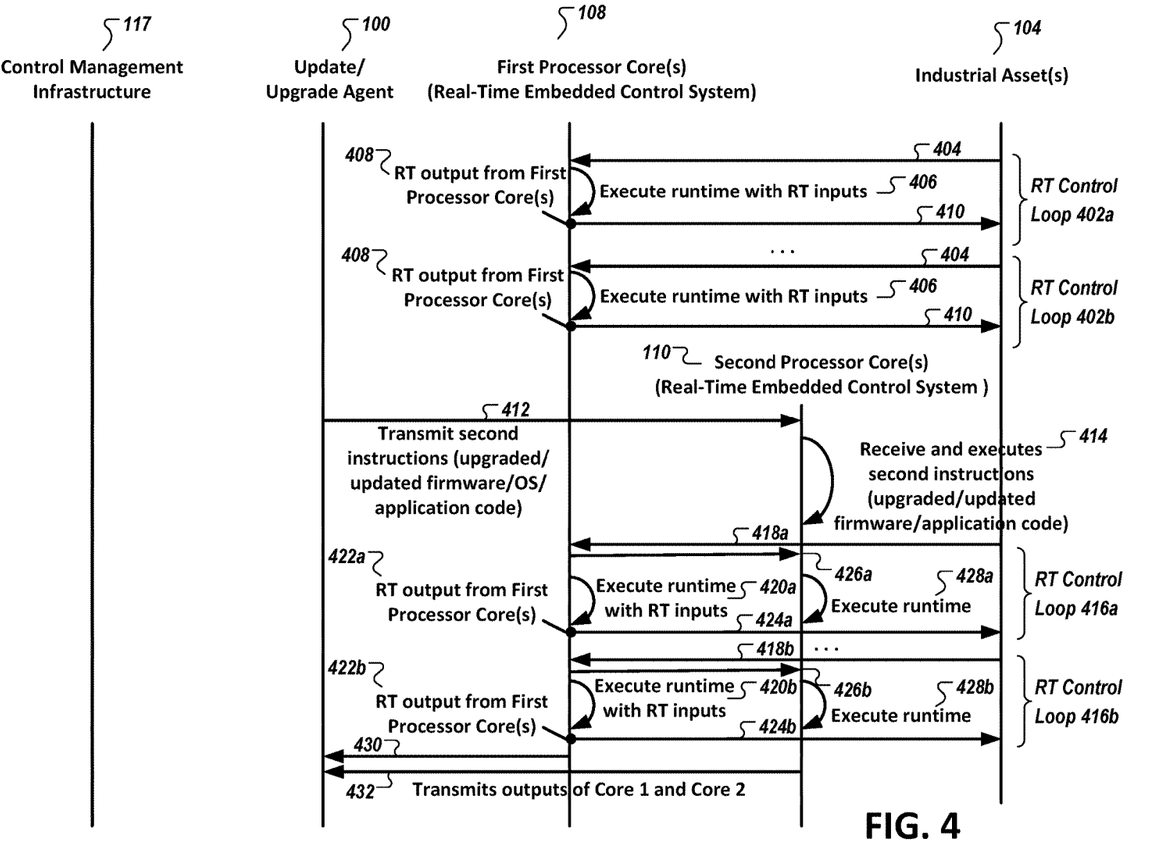
FIG. 4 is a flow diagram of a process of operating an update/upgrade agent to provide update/upgrade instructions for a control system in an uninterrupted manner and to provide in-situ validation of the update/upgrade instructions executing at the control system, in accordance with an illustrative embodiment.

FIG. 4 is a flow diagram of a process of operating an update/upgrade agent to provide update/upgrade instructions for a control system in an uninterrupted manner and to provide in-situ validation of the update/upgrade instructions executing at the control system, in accordance with an illustrative embodiment. In FIG. 4, the first set of processor cores 108 is shown executing a number of real-time control loops (shown as 402a, 402b) with the industrial asset 104. For each control loop (e.g., 402a and 402b), the real-time embedded control system 102, via execution of the first instructions 114, receives (404) feedback control inputs from the industrial asset 104, execute (406) the run time control code to generate the first computed outputs 118, which is selected (408) and used to generate (410) control outputs to the industrial asset. In some embodiments, the feedback control inputs 404 and computed outputs 118 are generated in a given cycle and the control outputs to the industrial asset are provided at a next control cycle. To this end, events shown in FIG. 4 may occur over more than one control cycles.

Referring still to FIG. 4, the update/upgrade agent 100 is shown transmitting (412) the second instructions 116 (with update/upgraded firmware, operating system, and/or control application code) to the real-time embedded control system 102 to be executed by the second set of processor cores 110. Upon receiving the second instructions 116, the real-time embedded control system 102 may store the second instructions 116 and direct the second set of processor cores 110 to execute (414) the stored firmware, operating system, and control operations instructions.

In some embodiments, the first and second set of processor cores 108, 110 are part of a single processor unit (e.g., a multi-processor core chipset). In such embodiments, the real-time embedded control system 102 is configured to instantiate, via a hypervisor, a second instance of the real-time control, operating system, and firmware to be executed by the second set of processor core 110 using the second instructions 116.

Once operating, the first set of processor cores 108 and second set of processor cores 110 each concurrently executes, for a given set of control cycle, the real-time control loops (shown as 416a, 416b, 416c) with the industrial asset 104. As shown in FIG. 4, for each control loop (e.g., 416a, 416b, 416c, respectively), the real-time embedded control system 102, via execution of the first instructions 114 by the first set of processor cores 108, receives (418a, 418b, 420c, respectively) feedback control inputs from the industrial asset 104, execute (420a, 420b, and 420c, respectively) the run time control code to generate the first computed outputs 118, which is selected (422a, 422b, and 422c, respectively) and used to generate (424a, 424b, 424c, respectively) control outputs to the industrial asset 104. In addition, for each of the control loops (e.g., 416a, 416b, 416c, respectively), the real-time embedded control system 102, via execution of the second instructions 116, accesses (426a, 426b, 426c, respectively) feedback control inputs (418a, 418b, 418c respectively) provided by the industrial asset 104 and control state information generated from execution of the first set of processor cores 108, to generate the second computed outputs 122.

Referring still to FIG. 4, validation sequences, as described in relation to FIGS. 2 and 3 may be performed to validate expected operations of the second instructions 116 by the second set of processor cores 110. During the validation period, the firmware, operating system, and underlying control application is evaluated. In addition, temporary in-situ switch-over (e.g., for a single or finite number of control cycles) to operation via the second instructions as described in relation to FIGS. 2 and 3 may also be performed. In addition, application changes can be made online via test modes in which programmer or end user can make a change to the running system and monitor the effects. In such test modes, if the change produces an undesired effect, the changes can be backed out of the system.

In some embodiments, as the first and second computed outputs 118, 122 are generated, in some embodiments, the validation controller 128 aggregates and/or summarizes and transmits (430, 432) the computed outputs to the update/upgrade agent 100 to be included in a validation report. In some embodiments, the validation controller 128 compares differences of the first and second computed outputs 118, 122 and generate an alert, notification, or report to the update/upgrade agent 100. In some embodiments, the update/upgrade agent 100 is configured to generate and transmit (434) a corresponding alert, notification, or report to the control management infrastructure 117 to present to the end user (e.g., technician or engineer). In some embodiments, the user interface of the control management infrastructure is mobile-friendly and cloud aware such that an end-user can access validation data, generate reports, and perform the upgrade from a remote location.

Referring still to FIG. 4, once validation is completed, an end user can send (438) an in-situ switch-over command to the update/upgrade agent 100 to direct (440a, 440b) the real-time embedded control system 102 to use the second computed output 122 to regulate the industrial asset 104. In some embodiments, a command (440a, 440b) is sent to each of the first set of processor cores 108 and the second set of processor cores 110, e.g., to direct the second set of processor cores to generate the control state information to share with the first set of processor cores.

The switch-over may be performed in stages. In some embodiments, in the first switch-over stage, each of the first set of processor cores 108 and the second set of processor cores 110 may execute control instructions that access data associated with the feedback inputs (e.g., voltage, current, and digital inputs corresponding to power levels, current levels, temperature levels, pressure levels, volume levels, and etc.) of the industrial asset 104 while the underlying processing of the feedback inputs is performed by hardware executing the first instructions 114. These underlying processes may include the instructions that access hardware registers (e.g., ADC (analog-to-digital convertor) registers, counters registers, and etc.). In some embodiments, in a second switch-over stage, the underlying processing of the feedback inputs is performed by hardware executing on the second instructions 114. In some embodiments, the switch-over includes both the control applications and the underlying processes that directly interfaces with hardware registers.

In FIG. 4, each of the first set of processor cores 108 and the second set of processor cores 110 is shown (in control loops 442a and 442b) to continue to execute control instructions that independently access data associated with the feedback inputs. To this end, performance of the updated controllers can continually be compared in-situ in an extended validation sequence (shown as 446) while the older controller control system continues to run. During the extended validation sequence, the operation may be actively monitored by the validation controller and/or update/upgrade agent, but not by an end user or technician.

Example Hypervised Real-Time Embedded Control System

Figure 5:
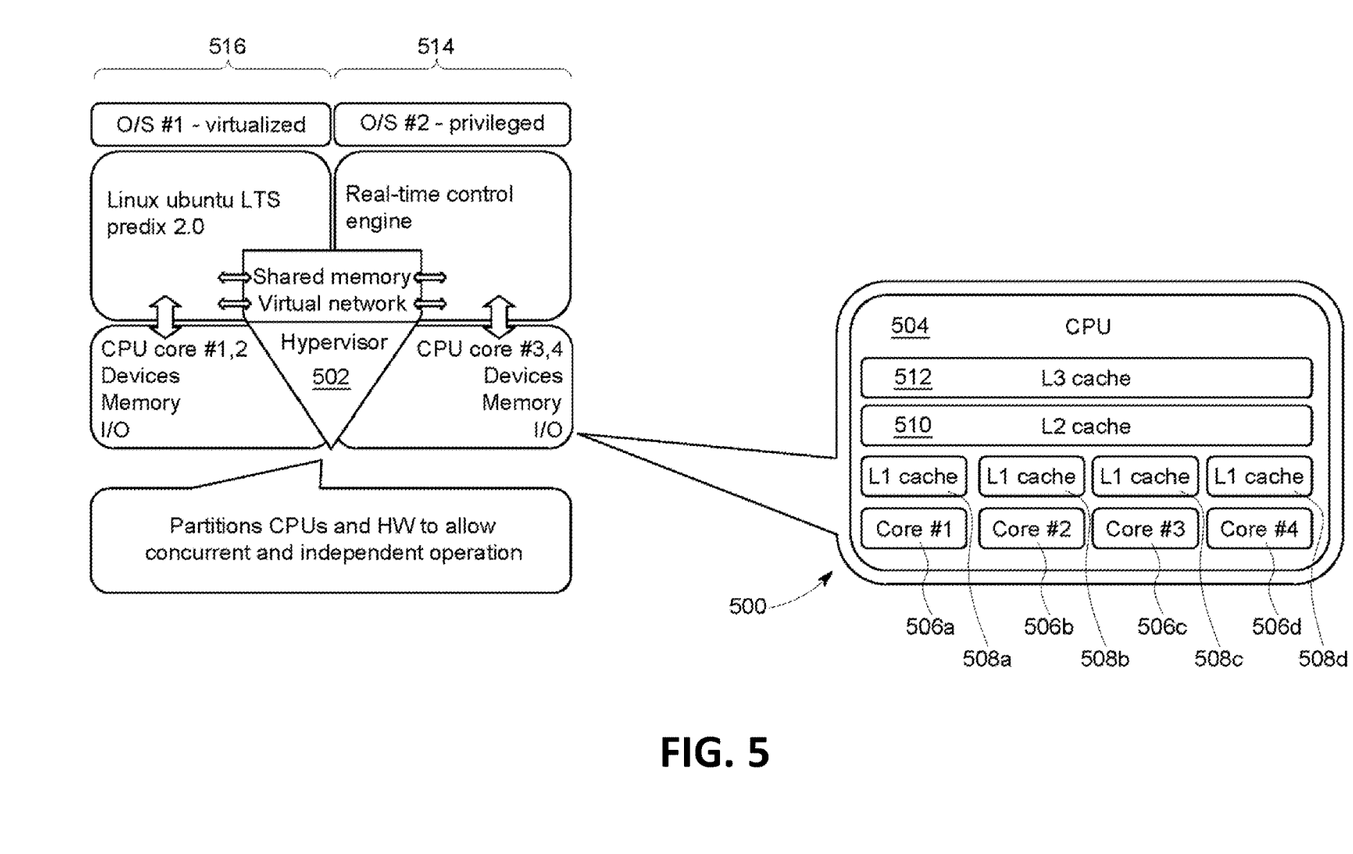
FIG. 5 is a diagram of an example hypervised real-time embedded control system, in accordance with an illustrative embodiment.

FIG. 5 is a diagram of an example hypervised real-time embedded control system 500 with a multiple core processor, in accordance with an illustrative embodiment. The hypervised real-time embedded control system 500 facilitates execution of two real-time controllers simultaneously within a same platform. Notably, the hypervised real-time embedded control system 500 provides for a miniaturized real-time embedded control device with a small-footprint board design that allows for smaller control cabinets to be used. Particularly for industrial environment, smaller controller cabinets is desired.

As shown in FIG. 5, the hypervised real-time embedded control system 500 includes a multi-core processor 504 (shown as "CPU") with two or more independent processing units (shown as "Core #1" 506a, "Core #2" 506b, "Core #3" 506c, and "Core #4" 506d). In some embodiments, and as shown in FIG. 5, each independent processing unit (506a-506d) operates with a corresponding L1 Cache (shown as 408a, 408b, 408c, and 408d) and to a shared L2 Cache 510 and a shared L3 Cache 512.

In this embodiment, and as shown in FIG. 5, the hypervisor 502 segments the CPU (e.g., shown as a quad-core processor) into two independent types of virtualized environment shown as a privileged environment 514 (shown as "O/S #2—Privileged") that executes the real-time control engine(s) and as a virtualized environment 516 (shown as "O/S #1—Virtualized"). Each CPU (e.g., 506c and 506d) allocated to the privileged environment 514 may be configured to operate an instance of the real-time embedded control system 102. That is, CPU 506c may be configured to execute the first instructions 114 and CPU 506d may be configured to execute the second instructions 116, as described in relation to FIGS. 1-4.

In some embodiments, the virtualized environment 516 is configured to operate a second type of deterministic control loop (referred to as a near-real-time control loop) with the privileged environment 514. This second deterministic control loop operates concurrently with the real-time control loops (e.g., 402a-402b, 416a-416c, as described in relation to FIG. 4) to provide controllable data from a cloud-based infrastructure in the control of the real-time embedded control system 102. Additional description of near-real-time control loop is provided in U.S. Prov. Appl. No. 62/435,610, filed Dec. 16, 2016, title "INDUSTRIAL INTERNET CONNECTED CONTROL SYSTEM," which has been incorporated by reference herein in its entirety.

Example In-Situ Update/Upgrade for Multi-Hypervised Environment

In some embodiments, the second instructions 116 includes firmware, operating system, and control applications for both the privileged environment 514 and the virtualized environment 516 to facilitate update or upgrade of the real-time control loop and the near-real-time control loop.

Figure 6:
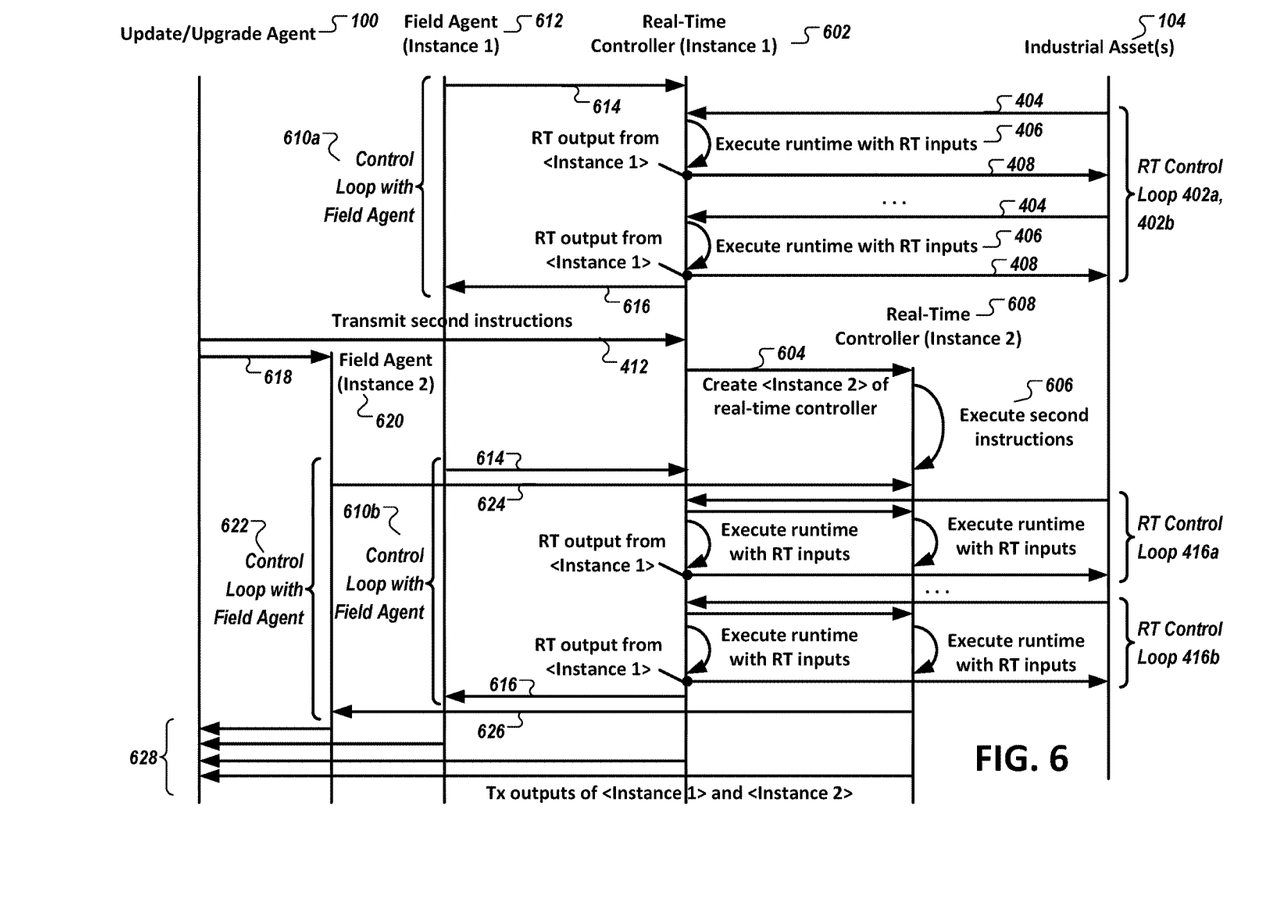
FIG. 6 is a flow diagram of a process of operating an update/upgrade agent to provide update/upgrade instructions for a hypervised multi-core control system in an uninterrupted manner and to provide in-situ validation of the update/upgrade instructions executing at the control system, in accordance with an illustrative embodiment.

FIG. 6 is a flow diagram of a process of operating an update/upgrade agent to provide update/upgrade instructions for a hypervised multi-core control system 500 in an uninterrupted manner and to provide in-situ validation of the update/upgrade instructions executing at the control system, in accordance with an illustrative embodiment.

In one aspect, FIG. 6 shows the update/upgrade of second instruction 116 via the hypervised multi-core control system 500. Similar to FIG. 4, a first instance 602 (e.g., executing via CPU 506c) of the real-time controller is shown executing a number of real-time control loops (shown as 402a, 402b) with the industrial asset 104. For each control loop (e.g., 402a and 402b), the real-time embedded control system 102, via execution of the first instructions 114, receives (404) feedback control inputs from the industrial asset 104, execute (406) the run time control code to generate the first computed outputs 118, which is selected (408) and used to generate (410) control outputs to the industrial asset. Then, the update/upgrade agent 100 is shown transmitting (412) the second instructions 116 (with update/upgraded firmware, operating system, and/or control application code) to the real-time embedded control system 102 to be executed by the CPU 506d.

Upon receiving the second instructions 116, the real-time embedded control system 102 may store the second instructions 116 and direct the hypervisor 502 to instantiate (604) and execute (606) a second instance 608 (e.g., via the CPU 506d) of the real-time controller using the second instructions 116 in which the second instance 608 includes updated firmware, updated operating system (and/or components), and/or updated control operation instructions. Once operating, the first instance 602 and second instance 608 of the real-time controller each concurrently executes, for a given set of control cycle, the real-time control loops (shown as 416a, 416b) with the industrial asset 104, for example, as described in relation to FIG. 4.

In another aspect, FIG. 6 shows the update/upgrade of second instruction 116 for controls of the real-time control loop (shown as 402a-402b and 416a-416b) and the near-real-time control loop (shown as 610a and 610b). As shown in FIG. 6, the near-real-time control loop 610a provides closed-loop deterministic control between the real-time embedded control system 102 and a field agent 612. The field agent 610 may be executed in the virtualized environment 516, as described in relation to FIG. 5. In this example shown in FIG. 6, the field agent 612 transmits output feedback (614) to the first instance 602 of the real-time controller. The first instance 602 of the real-time controller uses the transmitted output feedback in its real-time control loops (e.g., 402a, 402b) to regulate the industrial asset 104 and provide feedback (616) to the field agent 612.

As shown in FIG. 6, upon receiving the second instructions 116, the hypervisor 502 also instantiates (618) and executes a second instance 620 (e.g., via the CPU 506d) of the field agent. The second instance 620 executes another instance of the near-real-time control (shown as 622) by transmitting output feedback (624) to the second instance 608 of the real-time controller and receives (626) feedback therefrom.

Validation (628) is performed for both the second instance 608 of the real-time controller and the second instance 620 of the field agent, e.g., via various embodiments discussed in relation to FIG. 4.

Example Local Embedded Control Device with Multi-Core Hypervised Platform

Figure 7:
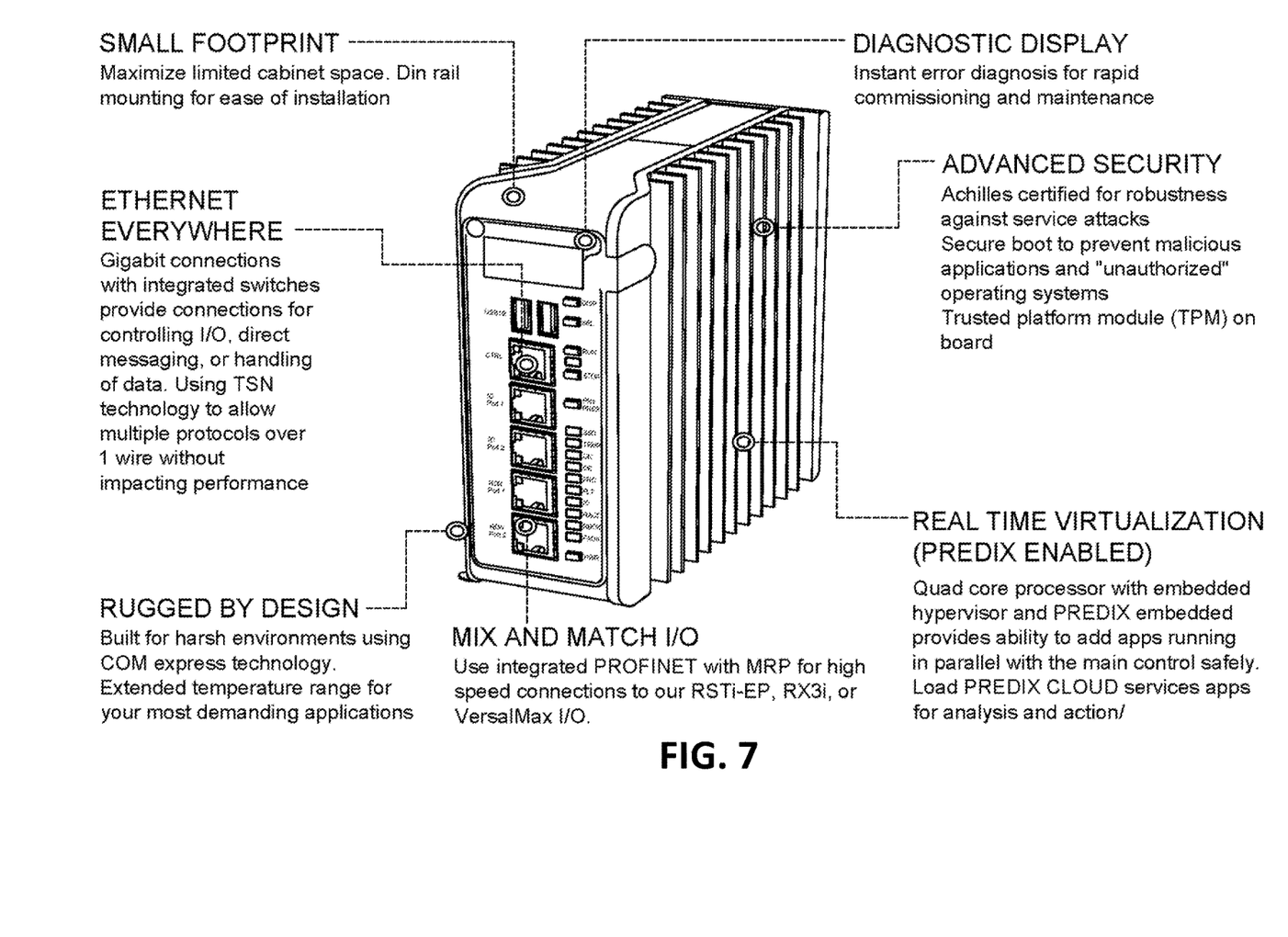
FIG. 7 is a diagram of a local embedded control device with a hypervised platform, e.g., as described in relation to FIG. 5, in accordance with an illustrative embodiment.

FIG. 7 is a diagram of a local embedded control device with a hypervised platform 502, e.g., as described in relation to FIG. 5, in accordance with an illustrative embodiment. In some embodiments, and as shown in FIG. 7, the local embedded control device may have a small footprint, e.g., to maximize limited cabinet space, while also providing mounting support (e.g., for DIN rails) to facilitate ease of installation of the local embedded control device. The local embedded control device is preferably built for harsh environment, e.g., using COM (computer-on-module) Express architecture, and that can operate in extended temperature ranges for demanding industrial applications. It is contemplated that other ruggedized standard may be used. In some embodiments, and as shown in FIG. 7, the local embedded control device includes a number of Gigabit connections to provide connections for controller I/O, direct messaging, or handling of data. In some embodiments, the local embedded control device executes Technology Support Net (TSN) protocols to allow multiple protocols to operate over a single set of wires. In some embodiments, and as shown in FIG. 7, the local embedded control device includes a quad-core processor with embedded hypervisor 502 and cloud gateway environment to facilitate execution and update/upgrade of field agent control applications that can execute in parallel to the main control (e.g., real-time control applications). In some embodiments, the processor can include a number of processing cores selected from the group consisting of 2 cores, 3 cores, 4 cores, 6 cores, 8 cores, 10 cores, 12 cores, 14 cores, and 16 cores. The field agent control applications may include service apps, e.g., for analysis and action. In some embodiments, and as shown in FIG. 7, the local embedded control device includes advanced security and is, e.g., Achilles certified for critical communication robustness testing of the Virtual Machine (VM) against service attacks. In some embodiments, secure boot operations is used to prevent malicious application and unauthorized operating systems services from being executed. In some embodiments, secure boot operations include validating the firmware and validating the image and boot instructions, e.g., for the hypervisor, the real-time operating system, for the kernel instructions, and etc. In some embodiments, a Trusted Platform Module comprising a secure crypto-processor, which is a dedicated microcontroller designed to secure hardware by integrating cryptographic keys into devices, operates with the CPU (e.g., 504a-504d), and operates in accordance with the Trusted Platform Module (TPM) standard. In some embodiments, and as shown in FIG. 7, the local embedded control device includes IO interface, e.g., that operates Profinet, to provide high-speed data exchange with the real-time embedded control system 102.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

In some embodiments, the exemplified system and method is implemented in a duplex control systems comprising two separate controllers each having its own set of controller hardware.

What is claimed is:

1. A method for operating an embedded control system for controlling an asset, the embedded control system comprising a first processor core and a second processor core, the method comprising:
    executing, by the first processor core, a first set of instructions to generate a first stream of control parameters;
    receiving, by the second processor core, a second set of instructions;
    executing, by the second processor core, the second set of instructions to generate a second stream of control parameters, wherein the second set of instructions are executed concurrently to the first set of instructions;
    monitoring a portion of the first stream and a corresponding portion of the second stream, or one or more parameters derived therefrom, for deviations based on a set of validation criteria and/or for instability conditions;
    validating the second stream in response to the monitoring;
    receiving a selection command associated with a selection of the second stream in response to the validation; and
    causing the second stream to be outputted to an input-output interface of the embedded control system to control the asset in response to the selection command.

2. The method of claim 1, wherein the first processor core continues to generate the first stream after the second stream generated by the second processor core is selected to be outputted to the input-output interface.

3. The method of claim 1, comprising:
    monitoring the second stream to determine if one or more parameters of the second stream meets one or more pre-defined conditions; and
    in response to a condition of the pre-defined conditions being met, causing the first stream to be outputted to the input-output interface of the embedded control system to control the asset.

4. The method of claim 1, wherein the portion of the first stream and the corresponding portion of the second stream, or the one or more parameters derived therefrom, are graphically presented at a user computing device, the presentation being made available from a cloud control infrastructure.

5. The method of claim 4, wherein comparison parameters derived from the portion of the first stream and the corresponding portion of the second stream are graphically displayed at the user computing device.

6. The method of claim 1, wherein the second set of instructions are received at an update/upgrade agent executing on the embedded control system.

7. The method of claim 1, wherein the second set of instructions are received at an update/upgrade agent executing on a field device operatively coupled to the embedded control system.

8. The method of claim 1, wherein the second set of instructions are received at an update/upgrade agent executing on a computing device located in a cloud control infrastructure.

9. The method of claim 1, wherein the first processor core and the second processor core are located on a same processor, wherein the first set of instructions are executed on a first hypervised instance executing on the first processor core, and wherein the second set of instructions are executed on a second hypervised instance executing on the second processor core.

10. The method of claim 1, wherein the first processor core is located on a first processor, and wherein the second processor core is located on a second processor.

11. The method of claim 1, wherein the first set of instructions and the second set of instructions each includes firmware instructions and operating system instructions.

12. The method of claim 1, wherein the first set of instructions and the second set of instructions each includes deterministic real-time control instructions.

13. The method of claim 1, comprising:
    validating, for a pre-defined period, the portion of the first stream and the corresponding portion of the second stream, or the one or more parameters derived therefrom; and
    generating a report, wherein the report includes differences between the portion of the first stream and the corresponding portion of the second stream.

14. The method of claim 1, wherein the deviations are established based on a set of historical data associated with the asset or a set thereof.

15. The method of claim 1, comprising:
    receiving a validation command that causes the second stream to be outputted to the input-output interface for a pre-defined period of time, wherein after the pre-defined period, the first stream is outputted to the input-output interface.

16. The method of claim 1, comprising:
    receiving a validation sequence command that comprises a sequence of validation commands, wherein with each successive validation command within the sequence, a given pre-defined period of time associated with a current validation command is lengthen compared to that of a previous validation command, wherein each validation command includes a pre-defined period that the second stream is outputted to the input-output interface such that, after the pre-defined period, the first stream is outputted to the input-output interface.

17. The method of claim 1, comprising:
    in response to receiving the second set of instructions, stopping execution of third instructions executing on the second processor core.

18. An embedded control system for controlling an asset, the apparatus comprising a first processor core and a second processor core in communication with a memory, the apparatus programmed to:
    execute, on the first processor core, a first set of instructions to generate a first stream of control parameters;

receive a second set of instructions;
execute, on the second processor core, the second set of instructions to generate a second stream of control parameters, wherein the second set of instructions are executed concurrently to the first set of instructions;
monitor a portion of the first stream and a corresponding portion of the second stream, or one or more parameters derived therefrom, for deviations based on a set of validation criteria and/or for instability conditions;
validate the second stream in response to the monitoring;
receive a selection command associated with a selection of the second stream in response to the validation; and
cause the second stream to be outputted to an input-output interface of the embedded control system to control the asset in response to the selection command.

19. A non-transitory computer readable medium having instructions stored thereon, wherein execution of the instructions, cause at least one processor to:

execute, on a first processor core, a first set of instructions to generate a first stream of control parameters for controlling an asset;
receive a second set of instructions;
execute, by a second processor core, the second set of instructions to generate a second stream of control parameters, wherein the second set of instructions are executed concurrently to the first set of instructions;
monitor a portion of the first stream and a corresponding portion of the second stream, or one or more parameters derived therefrom, for deviations based on a set of validation criteria and/or for instability conditions;
validate the second stream in response to the monitoring;
receive a selection command associated with a selection of the second stream in response to the validation; and
cause the second stream to be outputted to an input-output interface to control the asset in response to the selection command.

* * * * *